Patented Oct. 10, 1933

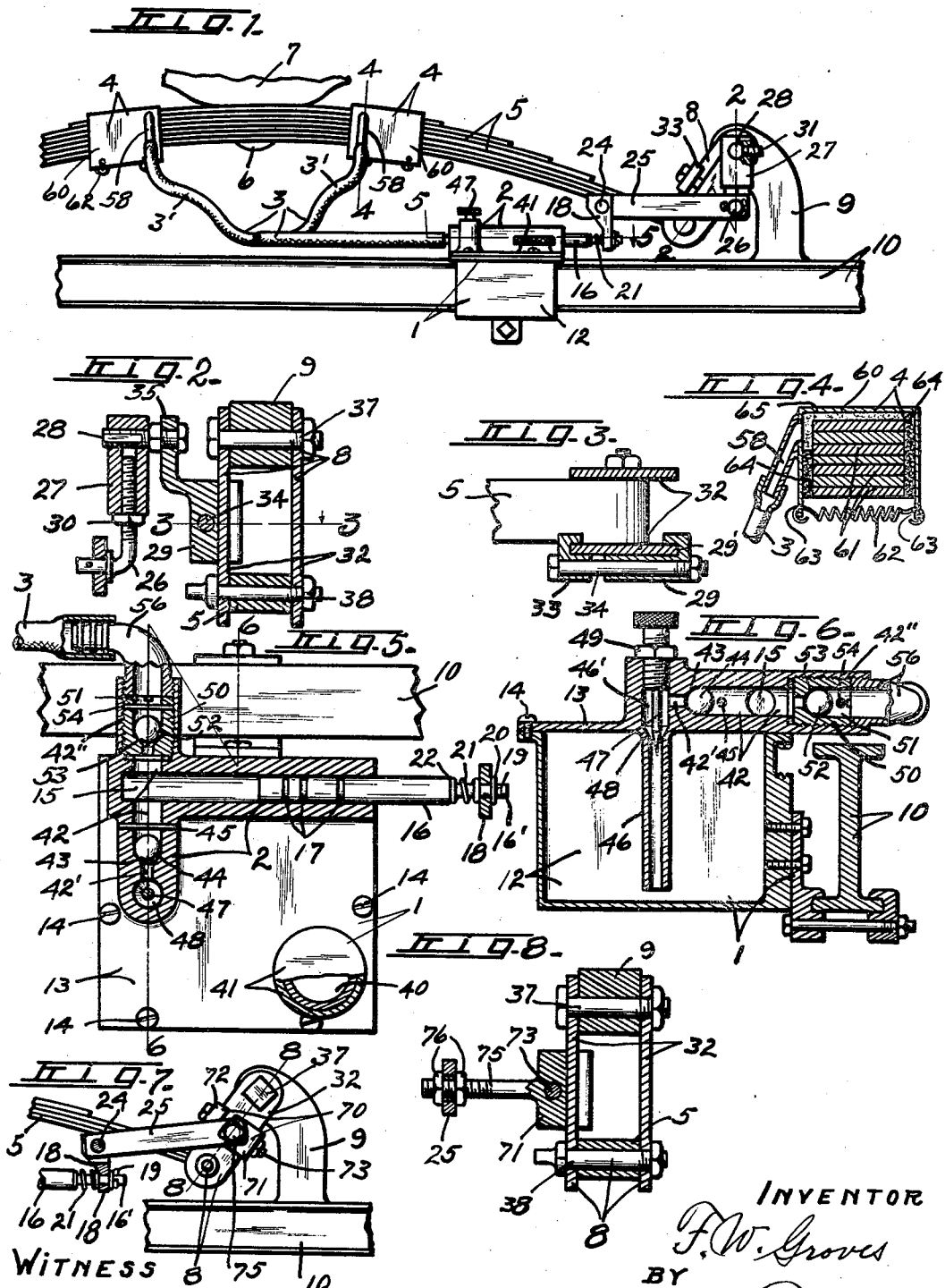

1,929,972

UNITED STATES PATENT OFFICE 1,929,972

FORCE FEED LUBRICATING SYSTEM

Floyd William Groves, Syracuse, N. Y.

Application April 5, 1932. Serial No. 603,300

3 Claims. (Cl. 184—7)

This invention relates to new and useful improvements in force feed lubricating systems, and pertains to a lubricating system particularly adapted for supplying lubricant to the springs, spring shackle bolts or other wearing parts of a road vehicle.

In lubricating systems for the chassis of road vehicles employing an oil reservoir and a pump for forcing the lubricant from the reservoir through a suitable conduit to the parts to be lubricated, it has been customary to drive the pump from the engine through a more or less complicated and expensive mechanism or to operate the pump manually at certain intervals which is a more or less exact and bothersome operation.

The main objects of this invention are to provide a force feed lubricating system for a road vehicle chassis which is fully automatic in operation, which will not require power developed by the motor for propelling the vehicle or other manufactured energy to operate it, that is simple, durable and economical in construction and one which may be quickly and easily attached to conventionally constructed chassis without requiring special chassis construction or the necessity of drilling holes therein or the altering of the chassis in any way.

In carrying out these objects, I have provided a convenient reservoir for containing lubricant, and which is rigidly clamped or otherwise secured to the front or rear axle of the chassis and which has associated therewith a simply constructed pump mechanism which is so connected with an adjacent spring shackle as to be operated by the movement of the chassis produced by the travel of the vehicle over the road. There may be one or more of these reservoirs and pumping units conveniently positioned at the front or rear of the chassis or at both front and rear as required, the pump being connected by suitable tubing or conduits with the part or parts to be lubricated so that lubricant will be discharged under pressure to the springs, shackles or other wearing parts to be lubricated by the action of the chassis incident to the traveling of the vehicle on the road.

Other objects and advantages relating to the details of the structure and to the form and relation of the parts thereof, will more clearly appear from the following description, taken in connection with the accompanying drawing in which:—

Figure 1 is a fragmentary front elevation of a chassis including portions of the front axle and spring connected therewith and with my novel lubricating system mounted thereon.

Figure 2 is an enlarged sectional view through the spring shackle member taken on line 2—2, Figure 1.

Figure 3 is a transverse sectional view taken on line 3—3, Figure 2.

Figure 4 is an enlarged transverse sectional view through one of the spring casings taken on line 4—4, Figure 1.

Figure 5 is an enlarged horizontal sectional view through the pump mechanism taken substantially on line 5—5, Figure 1.

Figure 6 is a vertical sectional view taken substantially in the plane of the line 6—6, Figure 5.

Figure 7 is a front elevation of a spring shackle illustrating a slightly modified manner of operably connecting the pump with said shackle.

Figure 8 is an enlarged detail sectional view taken on line 8—8, Figure 7.

In the drawing I have illustrated my novel force feed lubricating system as comprising a single oil reservoir 1 and a pump 2 associated therewith, the latter being connected by a suitable hose or conduit 3 with a pair of spring covers or casings 4 secured to the upper portion of a leaf spring member 5. The spring 5, in this instance, is shown extending transversely of the chassis with the central portion thereof connected in any well-known manner as by a bolt 6 with the frame of the chassis, as indicated at 7. The outer ends of the spring are connected by suitable shackles, one of which is shown at 8, to respective brackets or arms 9 secured to or made integral with respective ends of an axle as 10.

The reservoir 1 may be of any suitable construction and as shown in the drawing, consists of a rectangular receptacle 12 formed by die-casting or other suitable means, and having the upper open face thereof closed by a suitable cover 13 secured to the receptacle 12 by screws 14. The cover 13, as shown, is also a die-casting member having the upper face thereof provided with a pump chamber 15 which extends transversely across the rear side of the cover 13 with one end thereof open for receiving therein a pump plunger 16.

The pump plunger 16, in this instance, is a cylindrical rod having a close sliding fit in the chamber 15 and which is composed of steel or other suitable material and has the inner end portion thereof provided with a plurality of, in this instance three, annular grooves 17 adapted to receive oil therein for the purpose of maintaining an oil film between the plunger and wall of the chamber 15 for the purpose of maintaining a close connection between the plunger and wall of the chamber 15 so as to obtain the maximum pumping action of the plunger 16.

The outer end of the plunger 16 extends some distance beyond the pump chamber 15 and is reduced in diameter as at 16' for receiving thereon an arm 18 which is yieldingly maintained against a stop pin 19 and washer 20 by a spring 21 positioned between the shoulder 22 formed by the reduced end 16' of the plunger and the inner face of the arm 18.

The arm 18 extends laterally from the plunger 16 at substantially right angles thereto and has the outer end thereof pivotally connected as at 24 with one end of a link 25, said link having the other end pivotally mounted on one end of a rod 26 which has the other end thereof adjustably mounted in a rock arm 27 secured to a stud 28 which, in turn, is mounted on a bracket 29 mounted on the shackle 8. The rod 26 may be locked in any well-known manner as by a nut 30 in the adjusted position in the arm 27, while the arm 27 is secured to the stud 28 by a set screw 31 which prevents relative movement of the rock arm and said stud so that any rocking movement of the stud 28 will produce a corresponding rocking movement of the arm 27 and rod 26, and it is obvious that by adjusting the rod 26 in or out relative to the rock arm 27, that the travel of the plunger 16 may be correspondingly varied for a given movement of the rock arm 27.

The bracket 29, in this instance, has one edge thereof provided with a recess 29' for receiving therein one edge of the adjacent side member 32 of the shackle 8 while a correspondingly recessed clamp member 33 is mounted on the opposite edge of the side member, and the bracket and clamp are adjustably secured to the shackle member by means of a clamping bolt 34 which extends through aligned apertures in said bracket and clamp, as illustrated in Figures 2 and 3.

The bracket 29 has the upper end thereof provided with an extension 35 which extends upwardly from the bracket for supporting the stud 28 and it is preferable that the bracket be so clamped to the spring shackle 8 that the stud 28 will be in axial alignment with the upper shackle bolt 37 of the shackle member 8 so that regardless of the extent of the swinging movement of the shackle 8 produced by the movement of the chassis caused by the travel of the vehicle over the road, the stud 28 will always be maintained in axial alignment with the fixed shackle bolt 37, and it is obvious that any rocking movement of the bracket 29 produced by the shackle 8 will produced a corresponding rocking movement of the stud 28 which, in turn, will transmit this rocking movement to the rock arm 27 and thence through the link 25 and arm 18 to the pump plunger 16.

It will also be noted that by adjustably securing the rock arm 27 to the stud 28, that the arm 27 may be positioned when at rest, substantially midway between the extreme movements thereof regardles of the position of the side members 32 and lower shackle bolt 38.

In order that lubricant may be supplied to the reservoir 1, the cover 13 is provided at one side thereof with an opening 40 which is closed by a suitable cap 41 removably secured over said opening. In order that lubricant may be drawn by the operation of the plunger 16 from the reservoir 1, the pump chamber 15 has the inner end thereof in communication with a laterally disposed valve chamber 42 which extends outwardly from diametrically opposite sides of the chamber 15.

The outer end portion as 42' of the valve chamber 42 positioned at one side of the pump chamber 15 is reduced in diameter to form a valve seat 43 at the inner end thereof against which a ball valve 44 is adapted to seat for the purpose of preventing lubricant being forced outwardly through the chamber 42' by the inward movement of the plunger 16, said ball being maintained in proximity with the seat 43 by a limiting stop 45 which, in this instance, consists of a pin extending diametrically through the chamber 42 intermediate the seat 44 and pump chamber 15.

The outer end of the reduced portion 42' is in communication with a vertically disposed tube 46 which extends downwardly from the cover 13 to within a short distance of the bottom of the container 12.

The feed tube 46 has the upper end 46' thereof enlarged in diameter to form a valve chamber adapted to receive therein a valve 47 which is screw-threaded in the upper end of the chamber 46' and has the inner end thereof adapted to engage a valve seat 48 formed at the inner end of the chamber 46'.

The valve 47 may be secured in the adjusted position by any suitable means such as a lock nut 49 screw-threaded on said valve. The outer end 42'' of that portion of the valve chamber 42 positioned at the opposite side of the chamber 15 to that at which the feed tube 46 is located is enlarged in diameter for receiving therein a valve bushing 50 having a valve chamber 51 extending inwardly from the outer end thereof for receiving a valve 52 which is adapted to engage a valve seat 53 formed at the inner end of the chamber 51 for preventing back flow of lubricant into the pump chamber 15 as the plunger 16 is moved outwardly. In order that the valve 52 may be maintained in proximity to the seat 53, I have provided a stop 54 which, in this instance, consists of a pin extending diametrically through the chamber 51 with the ends thereof secured in the wall of the bushing 50.

In order that the conduit 3 may be connected with the valve chamber 42, any suitable means such as the elbow coupling 56 may be utilized and which, in this instance, has one end thereof screw-threaded in the outer end of the chamber 42'' adjacent the outer end of the bushing 50, while the other end of the coupling is corrugated for receiving and maintaining the conduit 3 thereon. This conduit 3 may extend along convenient portions of the chassis to connect the pump with parts to be lubricated and which, in this instance, has the outer end thereof provided with a pair of branches 3', each of which lead to an inlet port 58 of a respective metal casing 4. These casings 4 are similar in construction and, in this instance, consist of a U-shaped metal case 60 adapted to extend over the spring laminations 61 with the outer ends of the leg portions extending below said laminations a relatively short distance and yieldingly clamped to the sides of the spring by means of a pair of coil springs 62, each of which has the ends thereof extended through suitable apertures 63 provided adjacent the outer ends of the case 60.

The case 60 has secured to the inner side thereof a suitable lining 64 composed of felt or other absorbent material for preventing the lubricant from escaping between the edges of the laminated portions of the spring and the metal case 60. The central portion of the transverse portion of the case 60, however, is not provided with the lining so as to form an oil chamber 65 which is in communication with the inlet port 58 so that lubricant as oil forced by the pump plunger 16 through the conduits 3 and 3' may accumulate in the chamber 65 and be gradually fed through the absorbent lining between the laminations 61 of the spring 5 as said spring is flexed during the travel of the vehicle over the road.

In Figures 7 and 8, there is shown a slightly modified means for connecting the plunger-actuating means with the shackle 8. This means consists of a clamp bracket 70 composed of two sections 71 and 72, each of which is provided with a recess adapted to receive therein a respective side edge of one of the side members 32 of the shackle 8, and these members are secured in clamping relation upon the member 32 by means of a clamping bolt 73 which extends through registering apertures provided in the sections 71 and 72.

One of the sections 71 of the bracket 70 is provided with a laterally extending stud 75 which extends outwardly from one face thereof in a plane intermediate the upper and lower shackle bolts 37 and 38 and has rotatably mounted thereon one end of the plunger-actuating link 25 which may, as shown, be adjustably mounted upon the stud 75 in alignment with the plunger 16 by means of nuts 76 screw-threaded on the outer end of the stud 75 and positioned one adjacent either face of the link 25.

The length of the bracket 70 is somewhat less than the distance between the upper and lower shackle bolts 37 and 38 so that when it is desired to do so, the degree to which the plunger 16 is actuated by the shackle 8 may be controlled by adjusting the bracket 70 along the respective side member 32.

It is now obvious that I have produced a very simple, durable and efficient force feed lubricating system for a vehicle chassis, one which may be readily mounted on the conventional chassis without the drilling of holes or other alteration in the chassis, and although I have shown and particularly described the preferred embodiment of this invention, I do not wish to be limited to the exact construction shown, as various changes both in the size, form and relation of the parts thereof may readily be made without departing from the spirit of this invention as set forth in the appended claims.

I claim:

1. In a force feed chassis lubricating system, a lubricant reservoir, a pump mechanism in communication with the reservoir, a conduit connecting said pump with parts to be lubricated, means securing the pump to a member of the chassis, and means actuated by a spring shackle for operating said pump including a pivotal bracket secured to the shackle to be moved thereby, and linkage means operably connecting the bracket with the pump.

2. In a force feed lubricating system for a chassis including spring shackles having a pivotal swinging movement, a lubricant reservoir, a pump mechanism in communication with the reservoir, a conduit connecting said pump with parts to be lubricated, means securing the pump to a member of the chassis, means actuated by a spring shackle for operating said pump, including a pivotal bracket adjustably clamped to a shackle, and linkage means connecting the bracket with the pump.

3. In a force feed lubricating system for a chassis including spring shackles having a pivotal swinging movement about a fixed shackle bolt, a lubricant reservoir, a pump mechanism in communication with the reservoir, a conduit connecting said pump with parts to be lubricated, means securing the pump to a member of the chassis, means actuated by a spring shackle for operating said pump including a pivotal bracket clamped to a shackle to be moved thereby and with the pivot of the bracket in co-axial relation with the fixed shackle bolt, and linkage means operably connecting the bracket with the pump.

FLOYD WILLIAM GROVES.